(12) United States Patent
Han et al.

(10) Patent No.: US 6,558,843 B1
(45) Date of Patent: May 6, 2003

(54) METHOD FOR MANUFACTURING LITHIUM-MANGANESE OXIDE POWDERS FOR USE IN LITHIUM SECONDARY BATTERY

(75) Inventors: Yi Sup Han, Daejeon Kwangyeok-si (KR); Ho Gi Kim, Seoul (KR)

(73) Assignee: Korea Advanced Institute of Science and Technology, Kwangyeok-Si (KR)

( * ) Notice: Subject to any disclaimer, the term of this patent is extended or adjusted under 35 U.S.C. 154(b) by 15 days.

(21) Appl. No.: 09/691,524

(22) Filed: Oct. 19, 2000

(30) Foreign Application Priority Data

Feb. 2, 2000 (KR) .......................................... 2000-5210

(51) Int. Cl.$^7$ .......................... H01M 4/50; C01G 45/12
(52) U.S. Cl. ..................... 429/224; 429/231.1; 423/599
(58) Field of Search .............................. 429/224, 231.1, 429/231.95; 423/592, 599, 605, 641

(56) References Cited

U.S. PATENT DOCUMENTS

| | | | | |
|---|---|---|---|---|
| 5,288,474 A | * | 2/1994 | Reichert et al. | 252/62.9 R |
| 5,980,786 A | * | 11/1999 | Yamashita et al. | 252/518.1 |
| 6,040,089 A | * | 3/2000 | Manev et al. | 429/224 |
| 6,110,442 A | * | 8/2000 | Xia et al. | 423/599 |
| 6,117,410 A | * | 9/2000 | Ogihara et al. | 423/599 |
| 2002/0090553 A1 | * | 7/2002 | Han et al. | 429/224 |

* cited by examiner

Primary Examiner—Patrick Ryan
Assistant Examiner—Jonathan Crepeau
(74) Attorney, Agent, or Firm—Rosenberg, Klein & Lee

(57) ABSTRACT

A method for manufacturing $LiMn_2O_4$ powders for use in a lithium secondary battery positive electrode, is provided, in which oxide or carbonate is used as a positive electrode material, a solution is dried at a temperature higher than 150° C., and the resulting matter is put into a reaction furnace in order to be calcinated for a short time, after treating by spontaneous combustion. A certain degree of crystallization of the positive electrode powders can be obtained in the spontaneous combustion process. Thus, a battery having a large charging and discharging capacity and a long life cycle can be manufactured even under a high current condition.

5 Claims, 4 Drawing Sheets

METHOD FOR MANUFACTURING LITHIUM-MANGANESE OXIDE POWDERS FOR USE IN LITHIUM SECONDARY BATTERY

BACKGROUND OF THE INVENTION

1. Field of the Invention

The present invention relates to a method for manufacturing lithium-manganese (Li—Mn) oxide powders which are used for positive electrode materials of Li secondary batteries, and more particularly, to a method for manufacturing Li—Mn oxide powders for use in positive electrode materials of Li secondary batteries, in which a battery having a high productivity, a large capacity, and a long life cycle is obtained since powders having an excellent crystallization can be produced by heat-treating for a considerably shorter time than those of conventional methods.

2. Description of Prior Art

In general, in the case that a Li secondary battery is charged, lithium (Li) existing in $LiMn_2O_4$ powders being a positive electrode material is extracted and dissolved in an electrolyte, and the dissolved lithium ions are moved to a negative electrode carbon or graphite. Meanwhile, in the case that the Li secondary battery is discharged, lithium is separated from carbon and inserted into a crystalline lattice of the $LiMn_2O_4$ powders again. In this way, since the structure in the lattice of the $LiMn_2O_4$ powders is destroyed at the time of insertion and extraction of lithium, or $Mn^{+3}$ ion is dissolved into the electrolyte, a life cycle of the positive electrode is lowered. In order to prevent the life cycle of the positive electrode from being shortened, it is the most essential to manufacture powders capable of controlling a composition in chemical quantitative fashion, and having no foreign matter and an excellent crystallization.

Conventionally, for these reasons, a solid state reaction method is used in order to mass-produce powders having no foreign matter and an excellent crystallization, in which $LiCO_3$ or $LiOH$ and $MnO_2$ are well mixed and maintained for 150 hours at 400° C. or so, and then maintained again for 24 hours or more at 750° C. This conventional solid state reaction method gives an excellent crystallization but requires a long thermal treatment time, to accordingly cause the larger particle size. Thus, it is difficult to use it at the high current condition.

A sol-gel method is known as a method of manufacturing fine oxide powders, in which polyethylene glycol, citric acid, ethylene glycol or glycolic acid is dissolved in a metal salt solution, dried and thermally treated. Using this sol-gel method, $LiMn_2O_4$ powders having an excellent property are experimentally manufactured. However, there are several problems to solve industrially. In this method, metal nitrate is generally used as a metal salt material. Since lithium nitrate ($LiNO_3$) or manganese nitrate ($Mn(NO_3)_2 \cdot 6H_2O$) a main component material which is used for manufacturing the $LiMn_2O_4$ powders to be produced in the present invention well absorbs moisture in the air and reacts with the moisture, the material should be completely dried in a vacuum drier at 120° C. or so before weighing the material, in order to control the chemical quantitative composition so that metal ions of a certain quantity exist in the material.

Also, since the manganese nitrate ($Mn(NO_3)_2 \cdot 6H_2O$) is decomposed at too high temperature of the drier, and once it reacts with moisture to become ($Mn(NO_3)_2 \cdot xH_2O$), it is not possible to see a value of x. In this case, a metal salt solution should be necessarily analyzed to measure a metal ion concentration. As a result, an accurate chemical composition cannot be easily obtained.

Meanwhile, it is usual to dry the material for a long time, e.g. 48 hours or longer, at 100° C. or lower, in the drying process. In the case that a drying temperature becomes 100° C. or higher in order to shorten a drying time, an abrupt decomposition reaction of organic matter remaining in powders occurs at a final thermal treatment process, and the powders are dissipated in a reaction furnace. Accordingly, since a yield is low and the reaction furnace is polluted, it is difficult to use the conventional sol-gel method industrially.

During the time when the inventors endeavor to overcome the defects found in the conventional solid state reaction method and sol-gel method, it has been found that the above conventional defects can be solved by the processes of using oxide or carbonate as a positive electrode material, drying a solution at high temperature higher than 150° C., and putting the resulting matter into a reaction furnace in order to calcine for a short time, after treating a spontaneous combustion.

SUMMARY OF THE INVENTION

To solve the prior art problems, it is an object of the present invention to provide a method for easily synthesizing fine $LiMn_2O_4$ powders having an excellent crystallization, industrially.

To accomplish the above object of the present invention, according to the present invention, there is provided a method for manufacturing $LiMn_2O_4$ powders for use in a lithium secondary battery as a positive electrode, characterized in that oxide or carbonate is used as a positive electrode material, a solution is dried at high temperature higher than 150° C., and the resulting matter is put into a reaction furnace in order to calcine for a short time, after treating a spontaneous combustion.

For a positive electrode material which is appropriate for the embodiment of the present invention, oxide, carbonate, hydroxide, or pure metal, at least one of which does not absorb moisture in the air, is used. For example, it is possible to use $MnO_2$, $Mn_3O_4$, $Mn_2O_3$, $MnCO_3$ or manganese metal as a main component in the case of manganese. Also, in the case of lithium, $Li_2CO_3$, $LiOH \cdot H_2O$ or lithium acetate is adapted for the present invention.

Here, manganese is completely dissolved in nitric acid as a solvent in which lithium prepared so that a composition ratio with respect to manganese meets a predetermined ratio is completely dissolved, to thereby produce a metal salt solution. As a result, a chemical quantitative composition can be simply controlled. Here, an amount of the nitric acid solution used as the solvent is enough as an amount necessary to completely dissolve the manganese used. For example, in the case of $MnO_2$ of 2M, a nitric acid solution 2 liters of 2M can be used. Here, it is preferable that a hydrogen peroxide solution is added little by little until the $MnO_2$ is completely dissolved.

In the above, a ratio of lithium and manganese is 0.95~2.00 in 2Li/Mn. If the ratio is less than 0.95, lithium content becomes deficient, resulting in a large decrease in a battery capacity. If the ratio exceeds 2.00, an undesired crystalline phase having no electrochemical activation is produced.

After manufacturing a metal salt solution by the above process, a composition of citric acid and ethylene glycol composed as a predetermined molar ratio is dissolved in distilled water to then produce a mixture solution, and the mixture solution is mixed with the metal salt solution, by which a metal salt solution for use in manufacturing a positive electrode material is prepared.

Preferably, the molar ratio of ethylene glycol to citric acid is 0~5. If the ratio deviates from the above value, a drying time becomes long and a spontaneous combustion occurs in a drying process, to thereby cause an undesired result.

A method for manufacturing powders for a positive electrode material of a lithium secondary battery according to the present invention includes the steps of heating the obtained metal salt solution at high temperature of 150~200° C., evaporating moisture and making the solution into the state such as a resin, sufficiently drying the moisture evaporated resulting matter, and then a spontaneous ignition and combustion is performed in the air. During the time when the resin is produced, the metal salt solution is dried in a vacuum drier at least one time at 120~200° C. By doing so, it is preferable that a irregular combustion process is suppressed until the metal salt solution is completely dried.

The spontaneous combustion process enables a combustion of an organic matter although there is no additional external energy. Also, as an effect, a considerable amount of crystalline phase is formed by heat generated during burning of the resin, and the reaction furnace is prevented from being polluted due to an rapid reaction occurring during performing a thermal treatment. The spontaneous combustion process is performed by a general method. For example, it is sufficient if the metal salt mixture of the resin type is ignited using a lighter or match, without having any particular limitation.

The combustion product obtained via the spontaneous combustion process is input in a furnace and thermally treated for a predetermined time, to thereby produce lithium-manganese oxide powders ($LiMn_2O_4$). Since the thermal treatment process is performed at the state where powders are crystallized to a degree by the spontaneous combustion process, the thermal treatment time is shortened to a considerable degree in comparison with a conventional solid state reaction method. Thus, according to the present invention, it is possible to manufacture a lithium-manganese oxide of a single phase only with a thermal treatment of 2~24 hours performed at 600~800° C. in the air in order to make crystallization of the combustion powders much better.

Also, the present invention can shorten a thermal treatment time, in which a heating rate is 3° C./min or faster and a cooling rate is 0.5~10° C. /min.

In the present invention, it is possible to substitute a part of manganese by transition metal such as Co, V, Ni, Cr, Cu, Ti, or Zn, or metal having a valence of +1, +2 or +3, such as Al, Li or Sn.

BRIEF DESCRIPTION OF THE DRAWINGS

The above object and other advantages of the present invention will become more apparent by describing the preferred embodiment thereof in more detail with reference to the accompanying drawings in which.

DETAILED DESCRIPTION OF THE EMBODIMENT

Preferred embodiments of the present invention will be described in more detail with reference to the accompanying drawings. However, the present invention is not limited to these embodiments.

EXAMPLES 1 THROUGH 4

$MnO_2$ of 2 moles is put in a nitric acid solution 2l of 2M and then stirred. A hydrogen peroxide, solution is put little by little until the $MnO_2$ is completely dissolved. Then, $Li_2CO_3$ of 0.5 moles is put and stirred, to thereby produce a metal salt solution com. Ethylene glycol of 0 moles (Example 1), 1 mole (Example 2), 2 moles (Example 3) and 4 moles (Example 4) with respect to citric acid is dissolved in distilled water, and then the resulting product is mixed with the metal salt solution.

The mixed solution is put on a heating plate heated at 180° C. and maintained for 2 hours while heating. When a resin-like state is obtained after evaporating moisture to a degree, the resin-like mixed solution is put in the vacuum drier and then dried, while raising the temperature of the drier at 140° C., 160° C. and 180° C. at an interval of 1 hour. The mixed solution is maintained for about 6 through 9 hours until dew formed on the window of the vacuum drier is removed, and then the mixed solution is taken out and then contained in a stainless steel vessel, to then ignite the mixed solution to perform a spontaneous combustion, so that the mixed solution is changed into ash.

Figure 1:
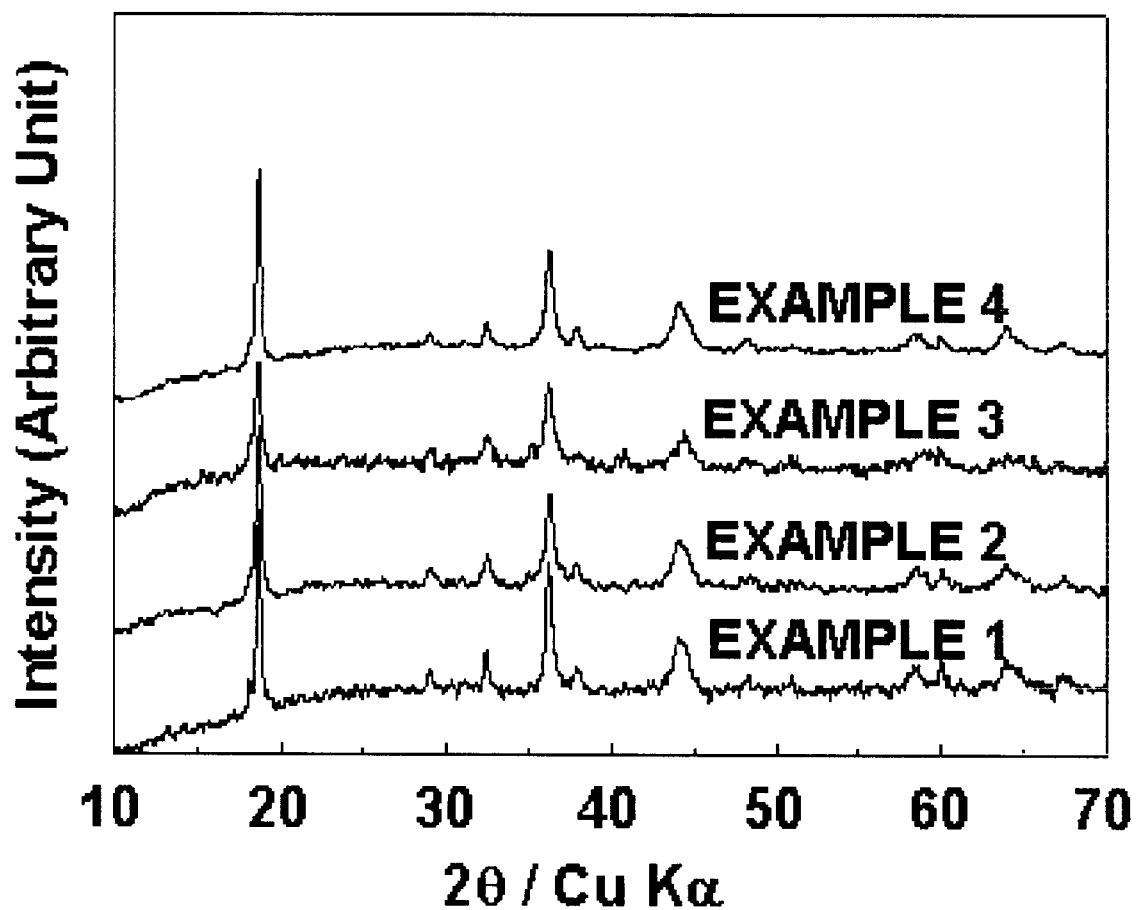
FIG. 1 is a graphical view showing crystalline states before calcinating and thermally treating lithium-manganese oxide powders manufactured by the resent invention.

FIG. 1 shows a crystalline state of ash formed by the above process. In FIG. 1, it can be confirmed that crystallization proceeds to a considerable degree by heat generated during the time when the resin is burnt.

EXAMPLES 5 THROUGH 9

Powders obtained in Example 4 are heated at a ate of 10° C. per minute in air atmosphere, and then maintained for 2 hours (Example 5), 4 hours (Example 6), 8 hours (Example 7), 16 hours (Example 8), or 24 hours (Example 9) at 800° C., respectively, and then cooled at a rate of 10° C. per minute, to synthesize a $LiMn_2O_4$ single phase.

Figure 2:
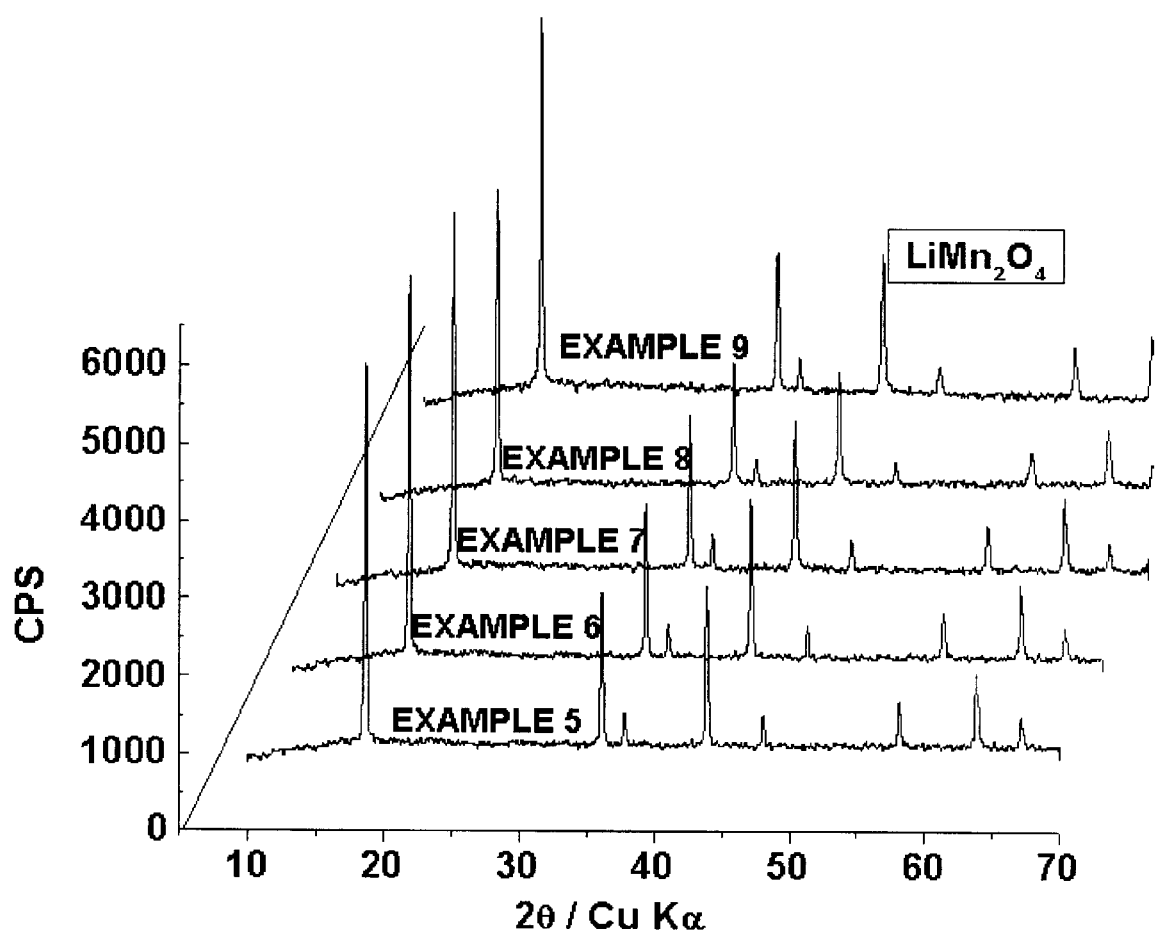
FIG. 2 is a graphical view showing crystalline states after calcinating and thermally treating lithium-manganese oxide powders manufactured by the present invention.

FIG. 2 shows a crystalline state of the powders which are thermally treated by time. As shown in FIG. 2, although the thermal treatment time is maintained very shortly for 2 hours or so, it can be confirmed that a perfect single phase of $LiMn_2O_4$ is synthesized. Thus, since the powders synthesized in the present invention is crystallized to a degree by the spontaneous combustion process of resin, a thermal treatment time for a phase synthesis becomes short and a thermal energy and a manufacturing time can be saved, to thereby produce powders economically.

Comparative Examples 1 and 2

$Mn(NO_3)_2.6H_2O$ and $LiNO_3$ which are maintained open for long as a used material are dried in an oven more than one week and dissolved in distilled water to thereby produce a metal salt solution. Thereafter, $LiMn_2O_4$ is manufactured in the same manner as that of each of Examples 1 through 4. Since $Mn(NO_3)_2.6H_2O$ which is maintained open for long absorbs moisture in the air during custody, although the material is dried in the oven, the crystalline water content cannot be seen exactly as $Mn(NO_3)_2.xH_2O$.

Figure 3:
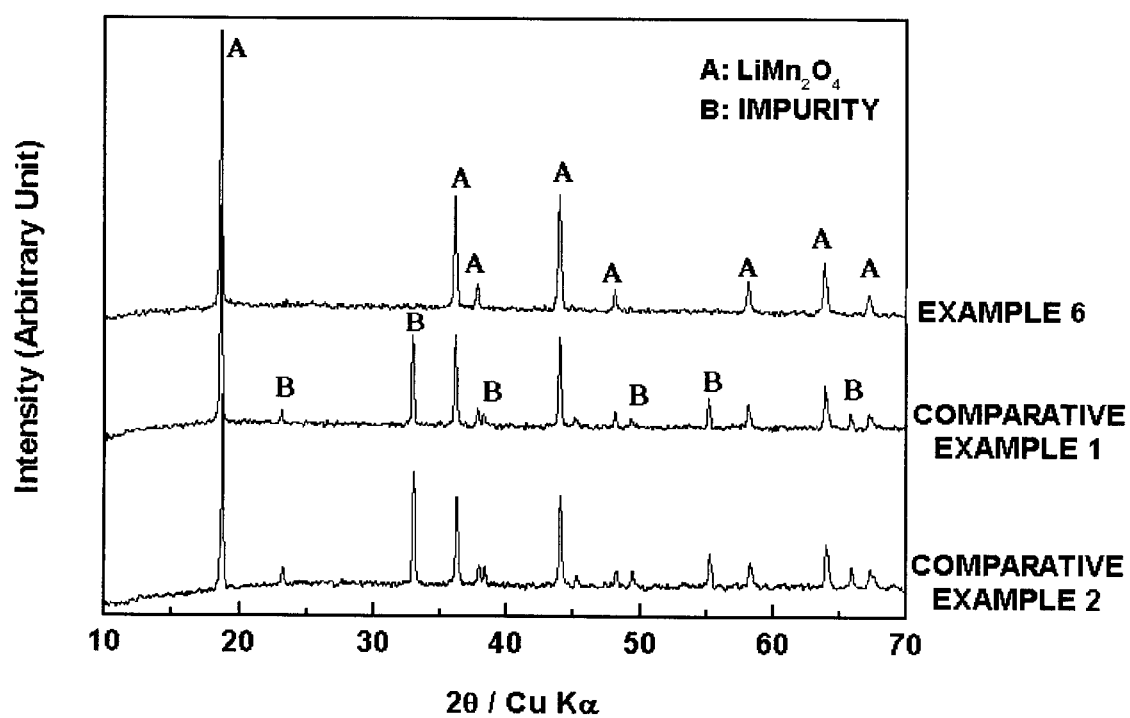
FIG. 3 is a graphical view showing crystalline states of the lithium-manganese oxide powders manufactured by the present invention and a comparative Example using a metal nitrate as a raw material.

Comparative Example 1 is the case that the same mole of $Mn(NO_3)_2.xH_2O$ as that of each of Example 1 through 4 is dissolved in the distilled water, assuming that the crystalline water content is 6, that is, x=6. Comparative Example 2 is the case that the crystalline water content is assumed 5, that is, x=5. FIG. 3 shows comparative results in which powders manufactured in the comparative Examples 1 and 2 are thermally treated in the air at 80° C. for 4 hours and then the crystalline state is compared with the powders of Example 6. It is confirmed that an amount of impurities exist in both the comparative Examples 1 and 2. It can be seen that no impurities exist in the Example 6. Thus, each of the Examples 1 through 4 according to the present invention provides a simple method of controlling the stoichiometric composition in order to synthesize $LiMn_2O_4$.

EXAMPLES 10 THROUGH 15

Powders obtained in each of Examples 1 through 4 are maintained for 4 hours at a thermal treatment temperature of 800° C., and then cooled at the cooling rate presented in Examples 5 through 9, to thereby manufacture $LiMn_2O_4$ powders.

Figure 4:
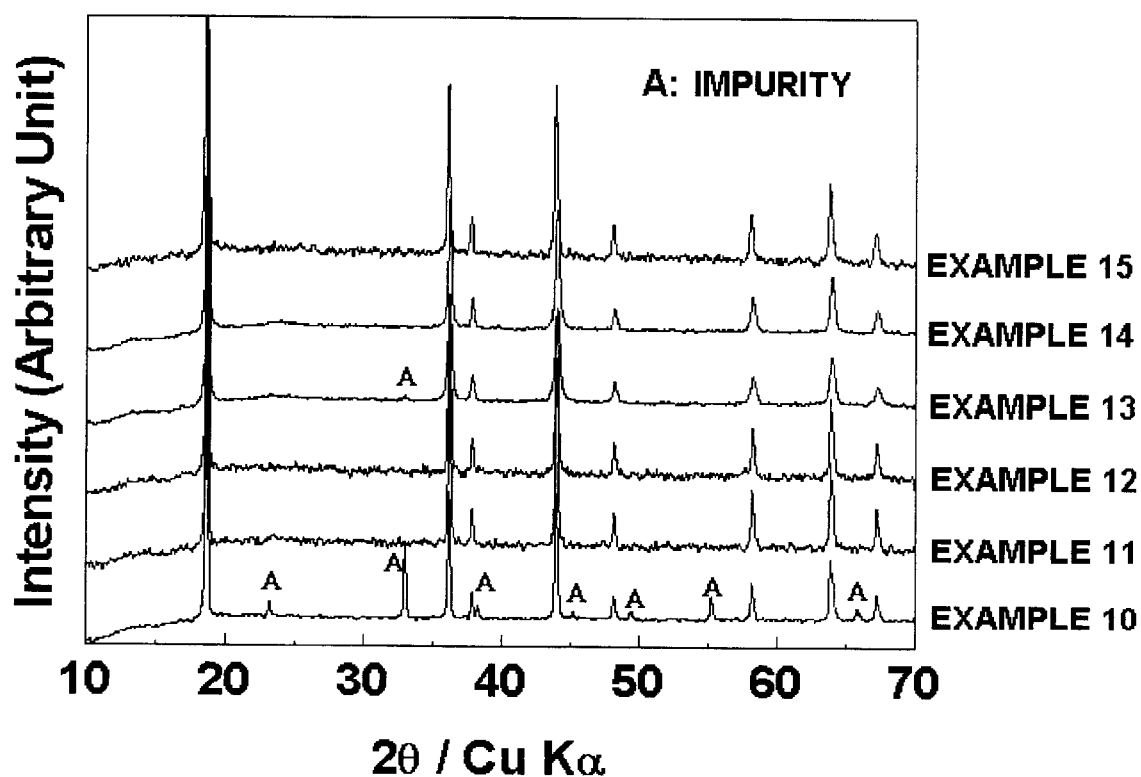
FIG. 4 is a graphical view showing crystalline states of the lithium-manganese oxide powders manufactured under the conditions of various embodiments in the present invention.

FIG. 4 shows crystalline states of powders manufactured in Examples 10 through 15, respectively. Examples 10, 11, 12 and 15 show crystalline states corresponding to the cases that ethylene glycol of 0 moles, 1 mole, 2 moles and 4 moles are added respectively and then spontaneously combusted, and then calcinated for 4 hours at 800° C. Examples 13 and 14 show crystalline states corresponding to the cases that ethylene glycol of 4 moles is added and then calcinated for 4 hours at 600° C. and 700° C., respectively. In Example 10, since the powders contain an amount of impurities, it is not appropriate for powders of the secondary battery positive electrode material. It can be seen that Example 13 is not also appropriate since the powders contain a little amount of impurities. The powders manufactured in Examples 11, 12, 14 and 15 have no impurities and are of $LiMn_2O_4$ single phase.

Experimental Examples: Manufacturing of a Positive Composite Electrode and Charging and Discharging Characteristic A composite electrode has been manufactured in order to measure battery characteristics of the manufactured positive electrode material powders. A combiner (PVDF) of 10 weight% and a conductive material of 10 weight% such as a carbon black are put with respect to the positive electrode powders and are dissolved by a proper amount of solvent (NMP), to then be mixed well in a rotary mixer. The thus-manufactured slurry is well spread on SUS-316 stainless steel net. Then, the SUS-316 stainless net is dried in a vacuum drier maintained at 120° C. for 1 hour or more. In this way, a positive composite electrode has been manufactured.

The positive composite electrode, Li-foil of 99.9% by Foote Mineral Co. and an electrolyte of 1M $LiClO_4$—PC premixed at Mitsubishi Chemistry Co. are put in a sealing container and assembled in a dry box filled with argon (Ar) in order to prevent penetration of moisture during measurement. Then, the assembled mixture is taken out and a charging and discharging test has been performed using a potentiostat/galvanostat of model 263 or 273 by EG. & G PARC. The charging and discharging test of the battery has been repeated at a cut-off voltage of 3.0V~4.5V with an application of 0.5 C rate current.

Table 1 shows specific surface area of the manufactured powders and battery characteristics of composite electrodes.

TABLE 1

Battery charging and discharging characteristic of powders manufactured according to the Examples 10 through 15

| Example | Ethylene glycol content (mole) | Calcination Temperature (° C.) | Specific Surface Area ($m^2/g$) | Initial Capacity (mAh/g) Charging | Initial Capacity (mAh/g) Discharging | Decrease in capacity after charging and discharging ten times (%) Capa(10)/Capa(ini)] |
|---|---|---|---|---|---|---|
| 10 | 0 | 800 | 3.66 | 84.7 | 77.2 | 79.7 |
| 11 | 1 | 800 | 3.77 | 132.9 | 127.0 | 89.8 |
| 12 | 2 | 800 | 5.24 | 133.2 | 127.8 | 91.2 |
| 13 | 4 | 600 | 6 or more | 111.0 | 110.7 | 85.5 |
| 14 | 4 | 700 | 6 or more | 127.0 | 117.6 | 90.2 |
| 15 | 4 | 800 | 5.79 | 130.7 | 126.7 | 94.9 |

In the case of Example 10, the specific surface area of the powders is similar to the specific surface area possessed by the powders manufactured by a general solid state reaction method. However, as predicted, there are many impurities at the crystalline state. Accordingly, the battery characteristic was bad. In Examples 13 and 14, since the thermal treatment temperature is low and a particle size of the powders is small, the specific surface area is considerably large. However, as the thermal treatment temperature is low, it can be seen that a crystallization of the powders is bad and a capacity of the battery is not so large due to a phase having an excessive amount of oxygen frequently appearing at low temperature such as $Li_2Mn_4O_9$.

In the case of Examples 11, 12, and 15, charging capacities are almost 130 mAh/g and discharging capacities are in the level of 127 mAh/g, which have considerably excellent characteristics. However, in the case of Example 11, since a particle size of the powders is large and a current quantity is large at 0.5 C rate or so, an interfacial resistance increases. Accordingly, after charging and discharging is repeated ten times, the battery capacity is decreased down to 89.8% of the initial capacity due to destruction of the crystalline lattice by entrance and exit of lithium ions. Meanwhile, as the ethylene glycol content increases, the specific surface area increases and the crystallization becomes superior. As a result, in the case of Examples 12 and 15, it can be seen that the battery capacities increase up to 91.2% and 94.9% of the initial capacity, respectively, after charging and discharging ten times.

Comparative Example 3

When a lithium-manganese oxide is manufactured in the same manner as that of each of Examples 1 through 15, a mixture solution is dried for more than 24 hours, at the drying temperature of 70° C., and then temperature raised at a rate of 1° C. per minute. Then, the mixture solution is maintained for 4 hours at 800° C. and then cooled at a rate of 0.5° C. per minute.

In Table 2, the merits of the present invention are compared with the powders manufactured by the solid state reaction method and the comparative Examples 3 and 4, in view of productivity and economy. In the case of the solid state reaction method, 3 hours or so are consumed as a charging time. The powders manufactured in the comparative Example 3 have an excellent battery characteristic as in the present invention. However, a irregular combustion reaction at a calcination process causes a restorable amount to be about 10% of the initial powders. In the case that the powders are manufactured in the comparative Example 4, a temperature rise rate is relatively slow, a thermal treatment time becomes long, and a particle size of the powders is not relatively small. As a result, charging and discharging is not possible at a large amount of current. And 3 hours or so are consumed as a charging time. Meanwhile, the powders manufactured in the present invention have a considerably shorter thermal treatment time in comparison with those of the solid state reaction method, a high yield of products in comparison with the comparative Example 3, and have a shorter drying time, a larger specific surface area, and a relatively small interfacial resistance in comparison with the comparative Example 4. As a result, it was confirmed that nothing but 2 hours are consumed as a charging time.

TABLE 2

Comparison of productivity and economy in the present invention

| Manufacturing method | Thermal treatment condition | Initial capacity (current amount/ charging time) | Specific surface area | Yield (%) |
|---|---|---|---|---|
| Solid state reaction method 1 | 450° C., 150 hrs + 750° C., 24 hrs | 122~125 mAh/g (0.3 C./3.33 hrs) | 3~4 m$^2$/g | — |
| Solid state reaction method 2 | 750° C., 92 hrs | 122~125 mAh/g (0.2 C./5 hrs) | 3~4 m$^2$/g | — |
| Solid state reaction method 3 | 750° C., 24 hrs | ~70 mAh/g (0.2 C./5 hrs) | 3~4 m$^2$/g | — |
| Example 15 | 180° C., 9~12 hrs + 800° C., 4 hrs | ~130 mAh/g (0.5 C./2 hrs) | 5~6 m$^2$/g | 90% or more |
| Comparative Example 3 | 180° C., 9~12 hrs + 800° C., 4 hrs | ~130 mAh/g (0.5 C./2 hrs) | 3~4 m$^2$/g | About 10% |
| Comparative Example 4 | 70° C., 24 hrs + 800° C., 4 hrs | ~130 mAh/g (0.3 C./3.33 hrs) | 3~4 m$^2$/g | — | spontaneous combustion is not exerted and calcinations are performed in the reaction furnace directly. Powders exert a spontaneous combustion reaction in the furnace at the beginning of a temperature rise. Thus, a sample remaining in the container containing the powders is nothing but about 10% of the initial powders, and the remaining powders are all dissipated and attached to the inner wall of the furnace and a heating element.

Comparative Example 4

When a lithium-manganese oxide is manufactured in the same manner as that of each of Examples 1 through 15, a As described above, in the case of the positive electrode powders for use in the lithium secondary battery manufactured in the. present invention, crystallization can be obtained to a certain degree at a spontaneous combustion process. Accordingly, the present invention has an excellent crystallization characteristic only with a thermal treatment of a shorter time. Thus, since the present invention has a considerably short thermal treatment time in comparison with an existing solid state reaction method, a treatment cost is very low. Also, since a particle is fine, the present invention has a merit that a battery having a large charging and discharging capacity and a long life cycle can be manufactured even under a large current condition. Also, the present invention solves the stoichiometric composition control possessed and the pollution of the reaction furnace in the existing sol-gel method, to thereby provide a merit of mass-producing powders having an excellent performance.

The present invention can be applied to a lithium-manganese oxide synthesis technology of substituting part of manganese which is added as a general addictive material, by transition metal such as Co, V, Ni, Cr, Cu, Ti, or Zn, or metal having a valence of +1, +2 or +3, such as Al, Li and Sn, as well as a pure lithium-manganese oxide synthesis technology composed of lithium and manganese.

What is claimed is:

1. A method for manufacturing lithium-manganese (Li—Mn) oxide powders for use in a lithium secondary battery, the Li—Mn oxide powders manufacturing method comprising the steps of:

(a) manufacturing a manganese solution in which one selected from the group of manganese oxide, manganese carbonate and pure manganese is completely dissolved in a nitric acid as a solvent, and then one selected from the group of lithium carbonate, lithium hydroxide and lithium acetate is completely dissolved into the manganese solution so that a 2Li/Mn ratio is 0.95~2.00, to thereby obtain a mixed metal solution;

(b) adding a mixture solution of citric acid and ethylene glycol or a citric acid in the mixed metal solution;

(c) drying the solution obtained in step (b) at temperature of 120° C.~200° C. in a vacuum drier at least one time so that a resin having a spontaneous combustion capability is formed, and then spontaneously combusting the resin by ignition at room temperature;

(d) calcinating the spontaneously combusted products obtained in step (c).

2. The Li—Mn oxide powders manufacturing method of claim 1, wherein the spontaneous combustion is performed by being ignited in ambient air.

3. The Li—Mn oxide powders manufacturing method of claim 1, wherein the calcination is performed for 2~24 hours at 600° C.~800° C. in air, in order to enhance a crystallization.

4. The Li—Mn oxide powders manufacturing method of claim 3, wherein at the calcination step, a heating rate is 3° C./min and a cooling rate is 0.5~10° C./min.

5. The Li—Mn oxide powders manufacturing method of claim 1, wherein part of manganese is substituted by transition metal, or metal having a valence of +1, +2 or +3.

* * * * *